UNITED STATES PATENT OFFICE.

ARTHUR PICKERING, OF BOSTON, CHARLES R. VICKERY, CHARLES R. ATWOOD, AND THE PHŒNIX MANUFACTURING COMPANY, OF TAUNTON, MASSACHUSETTS, ASSIGNEES OF GEORGE NIMMO.

IMPROVEMENT IN CRUCIBLES FOR MELTING STEEL AND OTHER METALS.

Specification forming part of Letters Patent No. 49,141, dated August 1, 1865; reissue No. 4,608, dated October 24, 1871.

*To all whom it may concern:*

Be it known that we, ARTHUR PICKERING, of Boston, in the county of Suffolk and State of Massachusetts, CHALES R. VICKERY and CHARLES R. ATWOOD, both of Taunton, in the county of Bristol and State aforesaid, and the PHŒNIX MANUFACTURING COMPANY, a corporation duly incorporated by the said State, and having its factory at said Taunton, hereby declare that we are owners of certain Letters Patent of the United States for an improvement in the manufacture of crucibles, granted to GEORGE NIMMO, of Jersey City, in the State of New Jersey, August 1, 1865, which are inoperative and invalid by reason of a defective specification, and that the following description is a full, clear, and exact specification of said improvement:

Prior to the invention of said NIMMO it was usual to make the entire pot or crucible of a mixture of black lead and other substances, the same mixture being used for all parts of the crucible, so that the interior of the crucible contained the same proportion of new plumbago as any other part of it. In consequence of this amount of carbon (in the form of plumbago) contained in the interior surface of said crucibles injury often arises to the steel melted in them in consequence of the steel absorbing carbon from the plumbago in the pots, and hence becoming changed in its character, the interior of the pot being also injured from the same cause. Plumbago, as is well known, is indispensable in crucibles on account of its conducting power transmitting the heat from the outside to the contents. The nature of said NIMMO's invention consists in a crucible having a lining of clay, or clay and sand, or any other similar cheap refractory material sufficiently free from carbon to prevent injury to the pots or their contents, whereby a cheaper and better pot or crucible is obtained that is more durable than those made entirely of the compound of plumbago and other materials in common use, and no injury results to the material fused in said pots or crucibles by the abstraction of carbon from the interior of said crucibles, as before stated.

The pots or crucibles are formed in any usual manner of the mixture ordinarily used for making what are well known as plumbago or black-lead crucibles, only a little thinner; and the lining is then applied smoothly to the interior of the crucible. The covers may also be lined in like manner, but this is not important. The materials used by said NIMMO for lining crucibles were sand and clay, intimately mixed together, or old crucibles ground fine or powdered and intimately mixed with clay, or with clay and sand, the plumbago in the old crucibles not affecting the steel when mixed with clay or clay and sand.

What we claim as the invention of said NIMMO, and desire to secure by Letters Patent, is—

A crucible of the kind known as plumbago crucibles, with a lining of clay or clay and sand, or similar material, for the purpose specified.

ARTHUR PICKERING.
C. R. ATWOOD.
C. R. VICKERY.
PHŒNIX MANUFACTURING CO.,
By C. R. VICKERY, *President.*

Witnesses:
THOMAS F. CURRIER,
I. E. MAYNADIER.

(115)